United States Patent
Schuck, III et al.

(10) Patent No.: US 9,223,142 B2
(45) Date of Patent: Dec. 29, 2015

(54) STEREOSCOPIC PROJECTION SYSTEM WITH MULTIPLE POWER GROUPS

(75) Inventors: Miller H. Schuck, III, Erie, CO (US); Michael G. Robinson, Boulder, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 162 days.

(21) Appl. No.: 13/010,755

(22) Filed: Jan. 20, 2011

(65) Prior Publication Data

US 2011/0176114 A1 Jul. 21, 2011

Related U.S. Application Data

(60) Provisional application No. 61/296,764, filed on Jan. 20, 2010.

(51) Int. Cl.

| | |
|---|---|
| G03B 21/00 | (2006.01) |
| G02B 27/22 | (2006.01) |
| G02B 27/26 | (2006.01) |
| G03B 21/14 | (2006.01) |
| G03B 35/20 | (2006.01) |
| G03B 35/26 | (2006.01) |
| H04N 13/04 | (2006.01) |

(52) U.S. Cl.
CPC ............... *G02B 27/22* (2013.01); *G02B 27/26* (2013.01); *G03B 21/14* (2013.01); *G03B 35/20* (2013.01); *G03B 35/26* (2013.01); *H04N 13/0459* (2013.01)

(58) Field of Classification Search
USPC ........................................................ 353/7–9
See application file for complete search history.

(56) References Cited

U.S. PATENT DOCUMENTS

| | | | |
|---|---|---|---|
| 5,914,818 A | 6/1999 | Tejada | |
| 5,993,004 A * | 11/1999 | Moseley et al. | 353/8 |
| 6,363,225 B1 * | 3/2002 | Sugawara | 396/331 |
| 7,528,906 B2 | 5/2009 | Robinson | |
| 2007/0024983 A1 * | 2/2007 | Yamamoto | 359/649 |
| 2008/0143964 A1 * | 6/2008 | Cowan et al. | 353/7 |
| 2009/0128780 A1 | 5/2009 | Schuck | |

FOREIGN PATENT DOCUMENTS

| | | |
|---|---|---|
| EP | 0745879 A2 | 12/1996 |
| EP | 1235092 A2 | 8/2002 |

(Continued)

OTHER PUBLICATIONS

File history of U.S. Appl. No. 11/732,302 to Lipton filed Apr. 2, 2007.

(Continued)

*Primary Examiner* — Renee D Chavez
(74) *Attorney, Agent, or Firm* — Neil G. J. Mothew

(57) ABSTRACT

Disclosed embodiments relate to a stereoscopic projection system and methods. An exemplary disclosed projection system includes an optical component disposed between the lenses of a lens arrangement. An exemplary lens arrangement includes a first power group, a second power group, and an aperture stop. In an embodiment, the optical component is disposed between the first power group and the aperture stop. In an exemplary embodiment, the optical component is proximate to the aperture stop. By disposing the optical component closer to or proximate to the aperture stop in the lens arrangement, various benefits may be realized, including improved contrast uniformity.

13 Claims, 3 Drawing Sheets

(56) References Cited

FOREIGN PATENT DOCUMENTS

JP          2007-233152  A      9/2007
WO     WO 2006038744  A1  *   4/2006

OTHER PUBLICATIONS

File history of U.S. Appl. No. 11/732,303 to Lipton filed Apr. 2, 2007.
File history of U.S. Appl. No. 11/583,243 to Cowan filed Oct. 18, 2006.
File history of U.S. Appl. No. 12/118,640 to Schuck filed May 9, 2008.
International search report and written opinion of the international searching authority for co-pending PCT/US2011/021944 mailed Oct. 17, 2011.
International preliminary report on patentability from corresponding PCT/US2011/021944 dated Jul. 24, 2012.

* cited by examiner

STEREOSCOPIC PROJECTION SYSTEM WITH MULTIPLE POWER GROUPS

CROSS REFERENCE TO RELATED APPLICATION

This application claims priority to U.S. Provisional App. Ser. No. 61/296,764, entitled "Wide field-of-view stereoscopic projection system," filed on Jan. 20, 2010, which is hereby incorporated by reference in its entirety for all purposes.

TECHNICAL FIELD

The present disclosure generally relates to projection systems and, more specifically, to stereoscopic projections systems.

BACKGROUND

Stereoscopic systems operate by presenting two distinct images to a viewer. Filtering may be utilized to present one image to one eye and the second image to the other eye. Filtering may employ polarization or spectral-division methods to separate the two images.

One example of a widely-implemented stereoscopic projection system is the ZScreen (manufactured by the assignee, RealD Inc.). The ZScreen includes a liquid-crystal based polarization switch located at the output of a projection lens. The ZScreen alternates the polarization state of the outgoing light between two orthogonal polarization states in synchronization with the display of the left and right eye images at the projection panel. Spectacles (or eyewear) pass orthogonal polarization states to each eye and complete the filtering function.

SUMMARY

An embodiment in accordance with the present disclosure includes a projection system operable to provide stereoscopic images. The projection system may include a lens arrangement comprising a first power group, a second power group, and an aperture stop disposed between the first and second power groups. The projection may further include an optical component disposed between a first lens of the first power group and a second lens of the second power group.

Another embodiment in accordance with the present disclosure includes a projection system operable to provide stereoscopic images. The projection system may comprise a panel operable to output light along a light path and a lens arrangement disposed in the light path. The lens arrangement may include a first power group, a second power group, and an aperture stop disposed between the first and second power groups.

The projection system may also include an optical component. The optical component is disposed in the light path between a first lens of the first power group and a second lens of the second power group. The projection system may further include a projection screen operable to receive light provided by the lens arrangement along the light path.

In some embodiments, the projection system may have a second panel operable to output light along a second light path and a second lens arrangement disposed in the second light path. The second lens arrangement may also include a first power group, a second power group, and an aperture stop disposed between the first and second power groups of the second lens arrangement.

The projection system may include a second optical component. The second optical component is disposed in the second light path between a first lens of the first power group of the second lens arrangement and a second lens of the second power group of the second lens arrangement. The projection screen is operable to receive light provided from the second lens arrangement along the second light path.

An exemplary embodiment in accordance with the present disclosure includes a method of projecting stereoscopic images on a screen. The method may include providing a light panel, directing light from the light panel through a lens arrangement and an optical component, and directing light exiting the lens arrangement toward the screen. In an embodiment, the lens arrangement comprises a first power group, a second power group, and an aperture stop disposed between the first and second power groups. The optical component is disposed between a first lens of the first power group and a second lens of the second power group.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
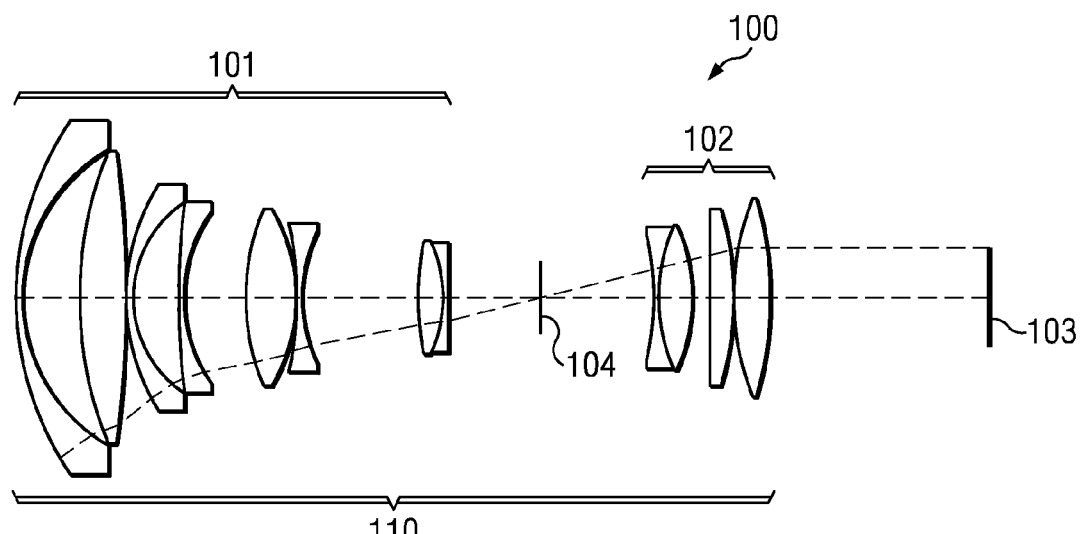
FIG. 1 is a schematic diagram illustrating conventional projection lenses.

FIG. 1 is a schematic diagram illustrating a side view of projection system 100, as described in U.S. Pat. No. 5,914,818, which is hereby incorporated by reference. The projection system 100 includes a lens arrangement 110, which includes a negative power group 101 near a screen (not shown) and a positive power group 102 near a panel 103. The lens arrangement 110 is in a reverse-telephoto arrangement, which allows a long back focal length for accommodating illumination, polarization, and/or color management components. In an embodiment, the projection lenses may be telecentric at the panel 103 to ensure uniformity in contrast and illumination. An aperture stop 104 may be implemented to control stray light and maintain high contrast.

Figure 2:
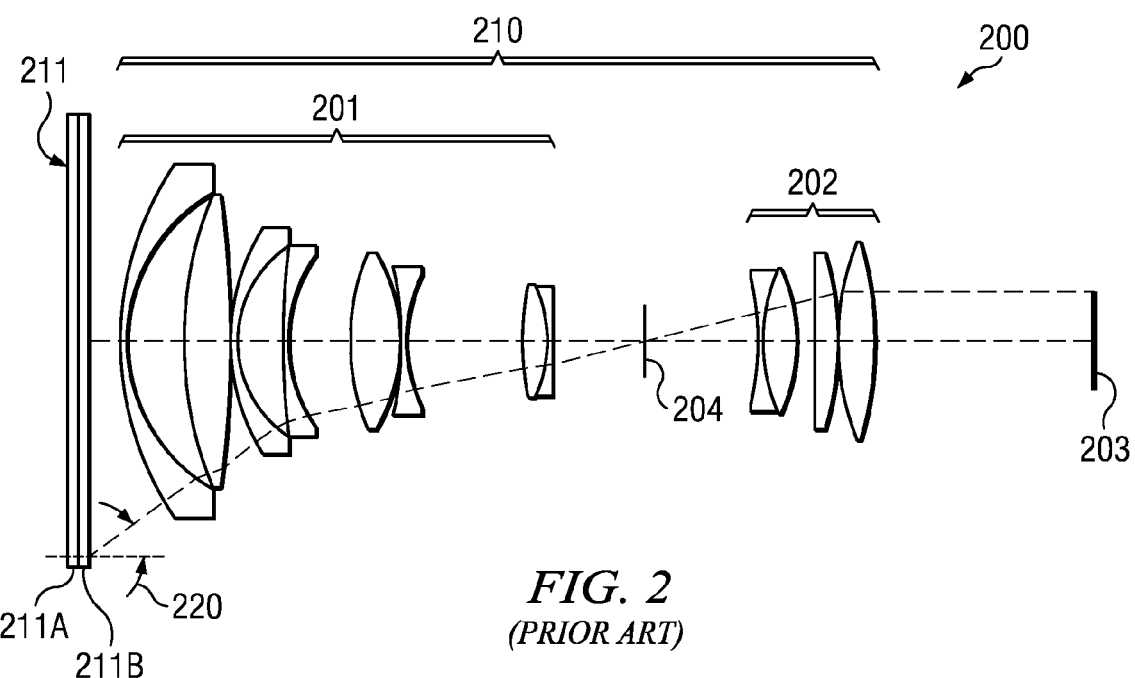
FIG. 2 is a schematic diagram illustrating another conventional projection system.

FIG. 2 is a schematic diagram illustrating a side view of another conventional projection system 200. The projection system 200 includes a filtering element 211 disposed outside of a lens arrangement 210. In an exemplary embodiment, the filtering element 211 may include a polarization switching Zscreen that includes a pre-polarizer 211A and a liquid-crystal switching element(s) 211B. As shown, the pre-polarizer 211A is located between the projection lens of the lens arrangement 210 and the liquid-crystal switching element(s) 211B. At the ZScreen 211, the angle of incidence 220 for a chief ray emerging from a pixel at the edge of the panel 203 is large. The liquid crystal cell retardation (or phase difference between orthogonal polarization states) differs for very large angles of incidence (AOI's) versus a ray passing through the center of the ZScreen 211, which has 0° AOI.

This variation in retardation with AOI implies that stereo contrast, which may be defined by the brightness of the transmitted polarization state relative to the leakage brightness of the orthogonal polarization state, is not uniform from the center to the edge of the image. As the angle of incidence gets larger (i.e., as the system field-of-view increases), the non-uniformity increases.

In addition, the overall stereo contrast in the image can decrease with increasing field-of-view. As the contrast non-uniformity increases, the integrated (or overall) stereo contrast can decrease.

One embodiment that may reduce stereo contrast non-uniformity with a wider field-of-view may involve disposing an optical component, such a switching element, at a plane in the projection lens where the angles of incidence are lower than those outside the lens. In an exemplary embodiment, a suitable location is within the lens arrangement 210. In some embodiments, a suitable location is near the aperture stop 204 of the projection lens.

Figure 3:
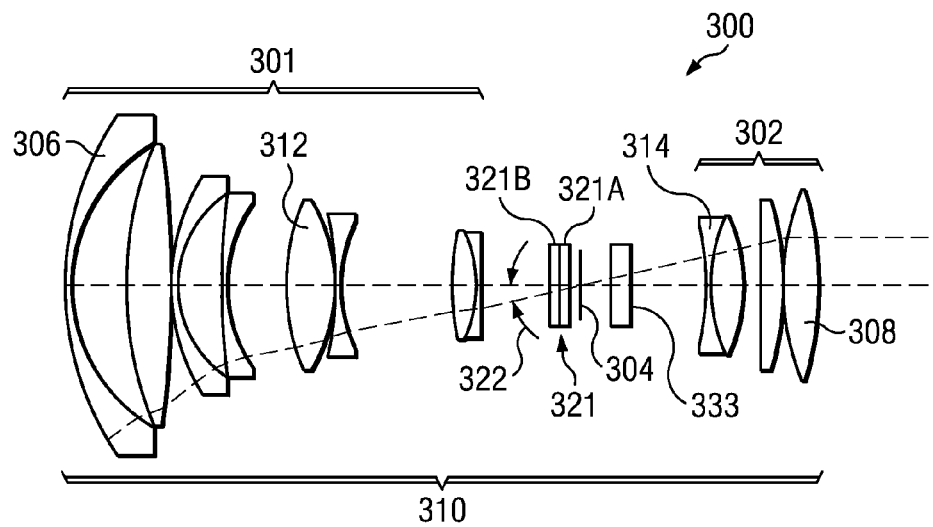
FIG. 3 is a schematic diagram illustrating an exemplary embodiment of projection system in accordance with the present disclosure.

FIG. 3 is a schematic diagram illustrating an exemplary embodiment of a projection system 300 operable to provide stereoscopic images in accordance with the present disclosure. The projection system 300 includes a lens arrangement 310 having a first power group 301, a second power group 302; and an aperture stop 304 disposed between the first and second power groups 301, 302. The projection system 300 may further include an optical component 321 disposed between a first lens 306 of the first power group 301 and a second lens 308 of the second power group 302. The lens arrangement 310 may be configured in a variety of ways. In the illustrated embodiment, the first power group 301 may be a negative power group and the second power group 302 may be a positive power group.

It is to be appreciated that by disposing the optical component 321 within the lens arrangement 310, the angles of incidence may be lowered. The location of the optical component 321 within the lens can be varied depending on the amount of non-uniformity that may exist and the internal space within the lens arrangement 310 available. In an embodiment, the first power group 301 further includes a second lens 312 disposed between the aperture stop 304 and the first lens 306 of the first power group 301, and the optical component 321 is disposed between the first and second lenses 306, 312 of the first power group 301. In another embodiment (shown in FIG. 3), the optical component 321 is disposed between the first power group 302 and the aperture stop 304. In another embodiment, the optical component 321 may be disposed proximate or directly adjacent to the aperture stop 304 to minimize the angle of incidence 322 and the non-uniformity that may result therefrom.

It may further be appreciated that more than one optical component may be disposed within the lens arrangement 310. In an embodiment, the system may further comprise a second optical component 333. The second optical component 333 may be disposed between the second power group 302 and the aperture stop 304 (as shown).

In an embodiment, the second power group 302 may further include a second lens 314 disposed between the aperture stop 304 and the first lens 308 of the second power group 302, and the projection system 300 may further include a second optical component (not shown) disposed between the first and second lenses 314, 308 of the second power group 302. In another embodiment, the projection system 300 may include a second optical component (not shown) between the second power group 302 and the aperture stop 304. For example, the second optical component (not shown) may be adjacent to the aperture stop 304.

It is to be appreciated that the optical components 321 or 333 of the projection system 300 may be any optical component that has an angular dependency in its performance or is susceptible to defects, such as dust, scratch, void, and other irregularities. A few examples such optical components include a modulator, a polarization switch, a color modulator, and a dichroic filter. Further examples include: achromatic polarization switches described in commonly-owned U.S. Pat. No. 7,528,906, which is hereby incorporated by reference; polarized color wheels described in commonly-owned U.S. patent application Ser. Nos. 11/732,302 and 11/732,303, which are hereby incorporated by reference; polarization modulators described in commonly-owned U.S. patent application Ser. Nos. 11/583,243 and 12/118,640, which are hereby incorporated by reference. Other examples may include the optical components described below, all of which suffer from its angular-dependency in its performance.

A spectral-division approach can suffer from stereo contrast non-uniformity with increasing field-of-view. The band-pass location(s) of dielectric film stacks may shift with angle-of-incidence, allowing light leakage from the left-eye image to the right-eye image (and vice-versa). Most dielectric film stack implementations place the filtering in the illumination path (versus outside the projection lens) to reduce this issue. If spectral-division is accomplished by retarder film stacks, stereo contrast uniformity may decrease with increasing field-of-view. Similar to liquid-crystal cells, retardation differs between a large angle of incidence (AOI) and a ray passing through the center of the ZScreen (0° AOI). Spectral-division retarder film stacks placed outside the projection lens arrangement 310 are susceptible to non-uniformities and lower contrast in the image.

Moreover, retarder and polarizer film stacks as described in U.S. Patent Pub. App. No. 2009/0128780, which is hereby incorporated by reference, can be implemented on a spinning wheel to produce alternating orthogonal polarization states. This "wheel" polarization switch may also suffer some stereo contrast non-uniformity with increasing field-of-view. Again, the film retardation may vary from normal incidence to large angles of incidence. If the wheel is located outside of the projection lens arrangement 310, non-uniformities may be visible in the resulting stereo image. Additionally, the size of the wheel may need to be large to capture the patch of light emerging from the projection lens.

In conventional systems (e.g., FIGS. 1 and 2), in which the distance from a projector to a screen is short (also know as "short throw"), ray bundles emerging from the projection lens are more converging than bundles emerging from a projection lens focused for "long throw" situations. Aberrations due to the insertion of an optical filter in the beam increase as the beam convergence increases. In systems in which the filter is tilted to avoid light reflected from the filter re-emerging in the image as noise, the aberrations will increase with the higher angles of incidence at the plate.

In systems suitable for a small throw ratio (e.g., home theatre, or more immersive modern theatre auditoriums), the output of the projection lens in the arrangement 310 may be highly divergent, and the light patch in closest proximity to the arrangement 310 is frequently quite large. So, in addition to angle dependence of performance, the polarization switch becomes physically cumbersome and relatively costly.

As discussed above, the overall stereo contrast in the image can decrease with increasing field-of-view. As the contrast non-uniformity increases, the integrated (or overall) stereo contrast can decrease. This reduction in stereo contrast uniformity with wider field-of-view may also occur with multiple stacks of liquid-crystal cells and film compensated liquid-crystal systems. The ZScreen is an example of a multiple liquid-crystal cell system. In the illustrated embodiment, the optical component 321 may be a polarization modulator, such as a ZScreen. The ZScreen 321 may include a pre-polarizer 321A that precedes a liquid-crystal (LC) switching element(s) 321B in the optical path. In an embodiment, the pre-polarizer 321A and the LC switching element 321B may each include a plurality of subcomponents, and may be configure as one integral component or two modular components. In an embodiment, the pre-polarizer 321A and the LC switching element 321B may be spaced from each other to avoid transfer of heat between the subcomponents of the ZScreen 321.

By placing the ZScreen 321 or any other suitable optical component inside the lens arrangement 310 (e.g., proximate to the aperture stop 304), the angle of incidence 322 of the chief ray emerging from a panel's edge (panel not shown) may be reduced. In some embodiments, the result is better contrast uniformity from center to edge of the resulting image, and better integrated contrast in the image. An additional benefit of placing the optical components 321 or 333 near the aperture stop 304 may be a reduction in image artifacts created by physical defects or variations in the optical components 321 or 333.

For high contrast in polarization-based systems, the optical elements following the optical components 321 or 333 may be configured to have very low birefringence so as not to alter the polarization states projected to the screen (screen not shown). In some embodiments, this implies that the lens in the lens arrangement 310 may have materials, coatings and mounting that reduces birefringence for rays passing through the system 300.

Figure 4:
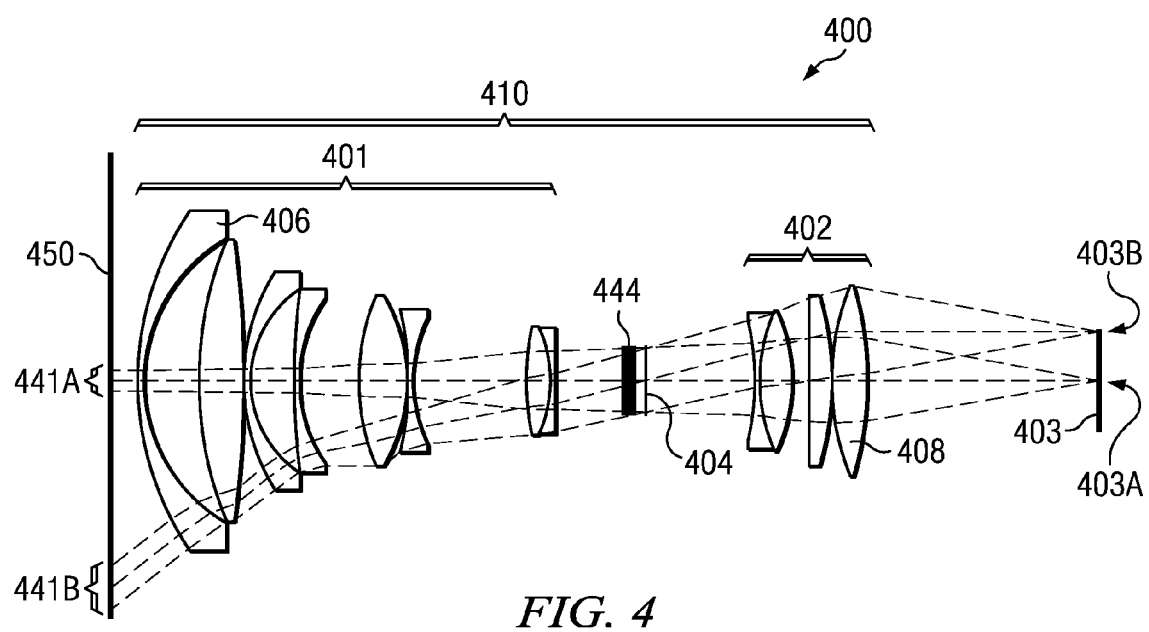
FIG. 4 is a schematic diagram illustrating yet another exemplary embodiment of projection system in accordance with the present disclosure.

FIG. 4 is a schematic diagram illustrating yet another exemplary embodiment of a projection system 400 operable to provide stereoscopic images in accordance with the present disclosure. The projection system 400 includes a panel 403 operable to output light along a light path and a lens arrangement 410 disposed in the light path. The lens arrangement may include a first power group 401, a second power group 402, and an aperture stop 404 disposed between the first and second power groups 401, 402. The projection system 400 may include an optical component 404 disposed in the light path between a first lens 406 of the first power group 401 and a second lens 408 of the second power group 402. The projection system 400 may further include a projection screen 450 operable to receive light provided by the lens arrangement 410 along the light path.

In the embodiment shown in FIG. 4, telecentric ray bundles emerge from the center 403A and edge 403B of the panel 403 and arrive at the center 441A and edge 441B of the screen 450. The ray bundles may overlap at the aperture stop 404. If a switching element 444 is disposed close to or proximate to the aperture stop 404 as indicated in FIG. 4, the ray bundles from each field point may sample the same portion of the switching element 444. Defects in the switching element 444 may be integrated similarly by the two ray bundles, and the resulting artifacts may manifest as a uniform change in brightness over the entire screen 450.

Compared to conventional systems, in which a switching element is placed outside the lens (not shown), ray bundles from the center 403A and edge 403B of the panel sample the switching element at distinctly different locations. A defect in one location of the switching element (not shown) will alter one ray bundle without altering the other. The result is an artifact in one portion of the image that is not visible in the rest of the image. The human eye is very sensitive to such non-uniformities or artifacts in images, resulting in an unpleasing viewing experience.

Another benefit of placing the switching element 444 within the lens arrangement 410, particularly closer to or proximate to the aperture stop 404, may be that the overall switching element package is smaller, leading to more compact packaging of the system and potentially lower system costs.

Figure 5:
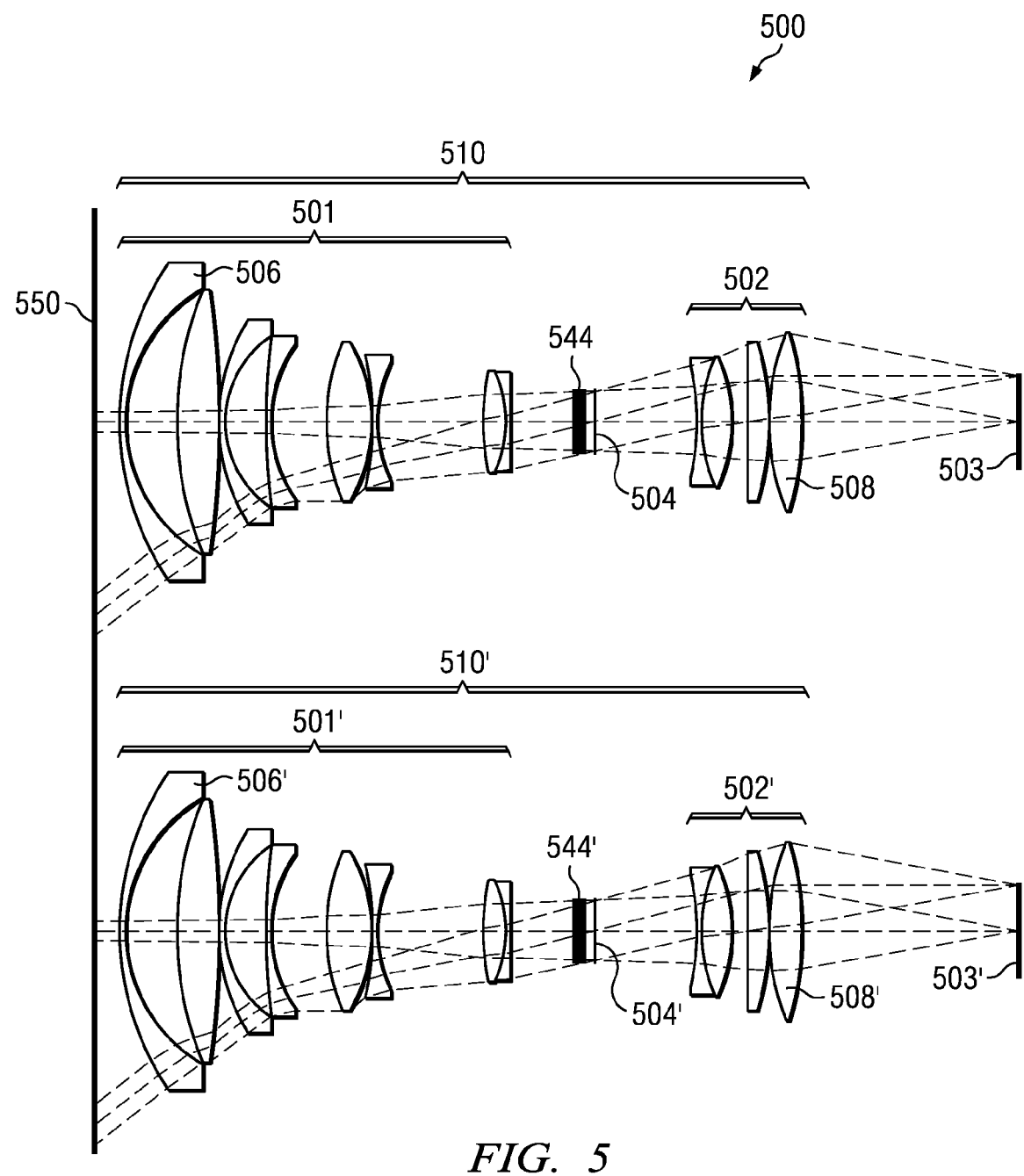
FIG. 5 is a schematic diagram illustrating an embodiment of a dual-projector system in accordance with the present disclosure.

FIG. 5 is a schematic diagram illustrating an exemplary embodiment of dual-projector system 500 operable to provide stereoscopic images in accordance with the present disclosure. The dual-projector system 500 includes two projectors, each having a panel 503, 503' operable to output light along a light path and a lens arrangement 510, 510' disposed in each light path. The lens arrangement 510, 510' may include a first power group 501, 501', a second power group 502, 502' and an aperture stop 504, 504' disposed between the first and second power groups 501, 501', 502, 502'. The dual-projector system 500 may include an optical component 544, 544' disposed in the light path between a first lens 506, 506' of the first power group 501, 501' and a second lens 508, 508' of the second power group 502, 502'. The dual-projector system 500 may further include a projection screen 550 operable to receive light provided by the lens arrangements 510, 510' along the light paths.

In some embodiments, the above described projection systems 300, 400, and 500 may be configured for operation in 2D and 3D modes. For 3D mode, a modulation element and/or other applicable optical components may be located in the optical path. For higher system efficiency in 2D mode, the modulation element and/or other applicable optical components may be moved out of the optical path by an actuating mechanism such as a slider. The actuating mechanism may be manual, automatic, or semi-automatic. Since the projection lens design accounts for the modulation element and/or other applicable optical components when it is in place, a dummy glass flat may be inserted in the optical path during 2D mode, or the air spacing between positive and negative groups may be increased to account for the modulation element's and/or other applicable optical components' optical path length. Removing the optical component in 2D mode may also increase the product lifetime of the switching element, since it is less exposed to high-energy light and heat when it is outside of the optical path.

A modulation element may also be implemented as a passive polarization modulator converter that is rotated in synchronization with the left and right eye images on the panel (for example, the "wheel" described above). By locating the wheel close to or proximate to the aperture stop of the projection lens, it may be possible to achieve better contrast and contrast uniformity in the final image and a more compact system. Additionally, the illumination spot size may be configured to be smaller at the aperture stop (versus outside of the lens) allowing for sharper transitions between polarization states with smaller wheel sizes. Exemplary polarization switching elements are described in commonly-owned U.S. Patent Pub. App. No. 2009/0128780. In an exemplary embodiment, the wheel need not be removed from the beam when switching between 2D and 3D modes. Rather, the eyewear can simply be removed for 2D operation, and if it is desired to increase 2D brightness, the input polarizer can be placed on a slider.

Some embodiments of the present disclosure may include an input polarizer, which may be modified to avoid the repercussions of thermal loading. For instance, a wire grid (reflective) polarizer can be used, which is physically separated from the other elements of the switch. The non-uniform heating due to polarizer absorption can otherwise induce birefringence in glass elements, degrading system contrast. The wire grid polarizer can further be tilted to dump the orthogonal polarization and avoid coupling of reflected light into the projected image. A fan may further be used to maintain acceptable thermal conditions. Absorptive wire grid polarizers may also be utilized for durability and stray light prevention.

Additional measures may further be utilized to achieve adequate product lifetime in view of the intense light in this location. Liquid crystal switches contain organic materials that degrade in high luminance and/or high heat environments. In an embodiment according to the present disclosure, LC devices utilize inorganic alignment materials, low stress-optic glass, and LC fluids that are less prone to degradation in such an environment.

Likewise, color-separation systems may benefit from locating the dielectric or retarder film elements close to or proximate to the projection lens aperture stop (versus outside of the projection lens). The benefits are better contrast and contrast uniformity, sharper state transitions, and a more compact system. However, it is understood that most color-separation systems place the filtering elements in the illumination path.

Finally, in typical projection lens designs, ray bundles from the panel emerge at the aperture stop as essentially collimated rays. Placing an optical element in collimated ray space means that little or no additional aberrations will be induced by the optical element, and the element can be tilted (to reduce stray light reflections) without additional aberration consequence.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A projection system operable to provide stereoscopic images, comprising:
   A display panel operable to output image light along a light path;
   A projection lens arrangement comprising:
      a first power group;
      a second power group disposed between the first power group and the display panel; and
      an aperture stop disposed between the first and second power groups;
      wherein the first power group is operable to pass light towards a projection screen; and
   an optical component disposed between the first power group and the second power group;
   wherein the optical component comprises a polarization switch.

2. The projection system of claim 1, wherein the optical component is disposed between the first power group and the aperture stop.

3. The projection system of claim 2, further comprising a second optical component disposed between the second power group and the aperture stop.

4. The projection system of claim 1, wherein the second power group further comprises a second lens disposed between the aperture stop and a first lens of the second power group, the projection system further comprising a second optical component disposed between the first and second lenses of the second power group.

5. The projection system of claim 1, wherein the second power group further comprises a second lens disposed between the aperture stop and a first lens of the second power group, the projection system further comprising a second optical component between the second power group and the aperture stop.

6. The projection system of claim 5, wherein the second optical component is adjacent to the aperture stop.

7. The projection system of claim 1, wherein the first power group is a negative power group and the second power group is a positive power group.

8. The projection system of claim 1, wherein the optical component comprises a modulator.

9. A projection system operable to provide stereoscopic images, comprising:
   a display panel operable to output image light along a light path;
   a projection lens arrangement disposed in the light path, the projection lens arrangement comprising:
      a first power group;
      a second power group disposed between the first power group and the display panel; and
      an aperture stop disposed between the first and second power groups;
      wherein the first power group is operable to pass light towards a projection screen;
   an optical component, the optical component disposed in the light path between the first power group and the second power group;
   wherein the optical component comprises a polarization switch; and
   a projection screen operable to receive light provided by the projection lens arrangement along the light path.

10. The projection system of claim 9, wherein the optical component is disposed between the first power group and the aperture stop.

11. The projection system of claim 9, the system further comprising: a second display panel operable to output light along a second light path; a second projection lens arrangement disposed in the second light path, the second projection lens arrangement comprising: a first power group; a second power group disposed between the first power group and the display panel; and an aperture stop disposed between the first and second power groups of the second projection lens arrangement; a second optical component, the second optical component disposed in the second light path between a first lens of the first power group of the second projection lens arrangement and a second lens of the second power group of the second projection lens arrangement; wherein the projection screen is operable to receive light provided from the second projection lens arrangement along the second light path.

12. A method of projecting stereoscopic images on a screen, comprising:
   providing a light display panel;
   directing image light from the light display panel through a projection lens arrangement and an optical component; and
   directing light exiting the projection lens arrangement to toward the screen;
   wherein the projection lens arrangement comprises
      a first power group;
      a second power disposed between the first power group and the display panel; and
      wherein the first power group is operable to pass light towards a projection screen;
      an aperture stop disposed between the first and second power groups;
      wherein the optical component comprises a polarization switch; and
      wherein the optical component is disposed between the first power group and the second power group.

13. The projection system of claim 12, wherein the optical component is disposed between the first power group and the aperture stop.

* * * * *